Patented Dec. 20, 1949

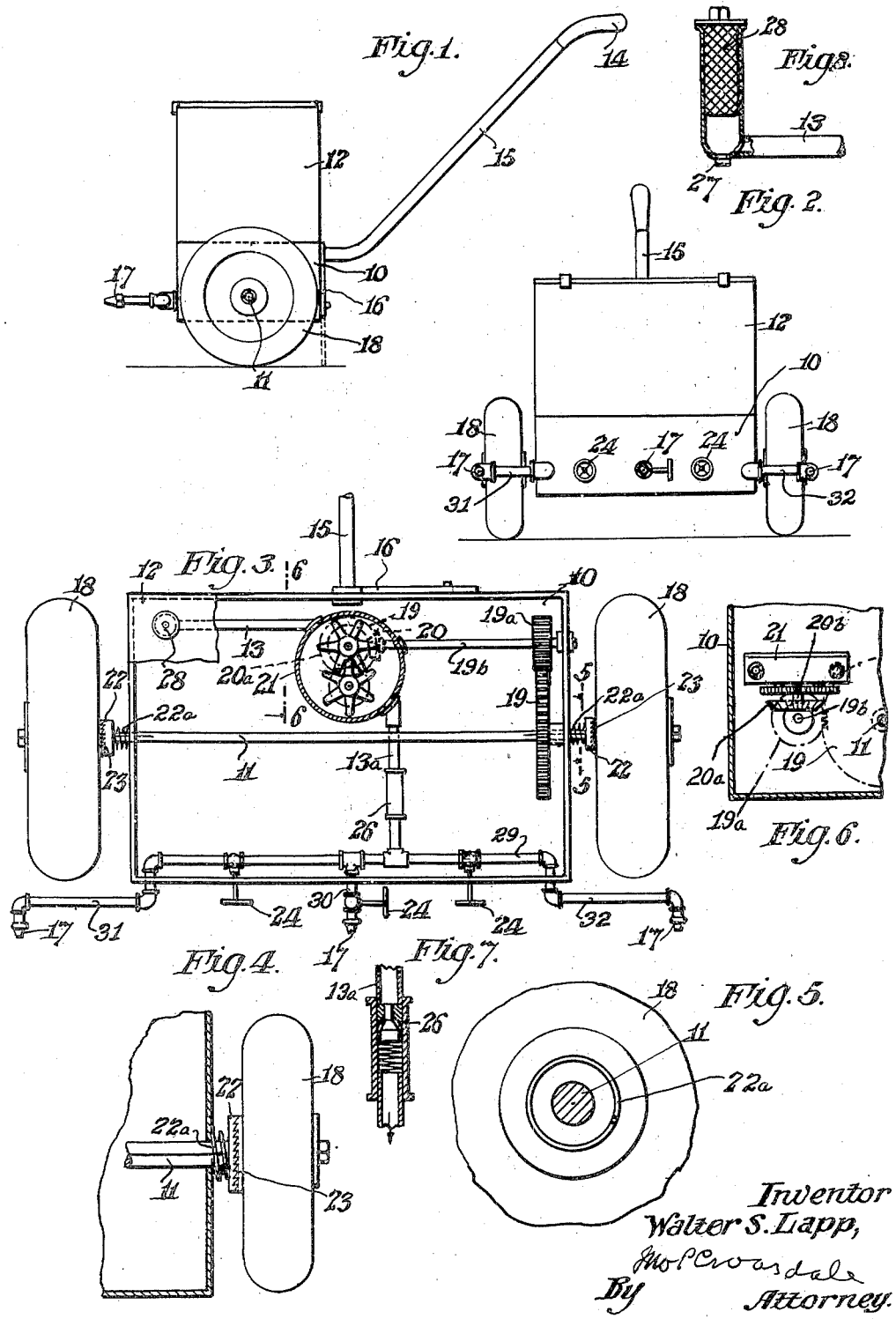

2,491,818

UNITED STATES PATENT OFFICE 2,491,818

VEHICULAR SPRAYING MACHINE

Walter S. Lapp, Lansdale, Pa.

Application July 13, 1946, Serial No. 683,473

2 Claims. (Cl. 299—45)

My invention relates to improvements in a turf spraying machine for delivering a spray of suitable material depending upon the nature of the vegetation to be effected.

It is a principal object of the present invention to provide a vehicular spraying machine for delivering, onto a selected area, solutions of materials such as hormone herbicides (weed killers), fertilizers or nutrients, growth promoting or growth inhibiting materials, insecticides or fungicides, oil, or dyes.

It is a further object of the present invention to provide a vehicular spraying machine which may be easily propelled by the user for the application of fluid materials in spray form and regulated as to quantity and location of spray delivery.

Other objects and advantageous features of the invention will be apparent from the specification and claims.

Referring to the drawings which illustrate merely by way of example suitable embodiments of my invention;

Fig. 1 is a side elevation of the device containing the invention.

Fig. 2 is a front elevation of the same.

Fig. 3 is a plan view of the frame in the horizontal plane beneath the tank.

Fig. 4 is a sectional view of the wheel-supported frame.

Fig. 5 is a detail on an enlarged scale of the spring wheel control, on line 5—5 of Fig. 3.

Fig. 6 is a view on an enlarged scale showing means for gear control of the pump.

Fig. 7 is a detail on an enlarged scale of an alternative mechanism for actuating the check valve.

Fig. 8 is a sectional view of the strainer and drain.

Similar numerals refer to similar parts throughout the several views.

Referring now more particularly to the drawings, the spraying machine in accordance with the present invention preferably includes a supporting frame 10 illustrated as rectangular in horizontal cross section, and having a tank 12 carried thereon and extending thereabove. The frame 10 has a transversely disposed axle 11, at the outer ends of which freely pivoted wheels 18 are mounted for supporting the frame 10 and the tank 12 carried thereby. A handle or push bar 15 is provided, secured to the frame 10 and has mounted thereon at its rear end, a handle 14 for manual gripping engagement by the operator. At the forward end of the handle bar 15, a pivotally mounted ground rest or support 16 is provided for supporting the frame when the handle 14 is not being utilized.

The axle 11 has mounted thereon, at the end portions and beyond the side portions of the frame 10, a ratchet collar 22 which is interposed between the wheel 18 and the frame and connected to the axle 11 for effecting rotation thereof. A spring 22a is interposed on each side between the frame 10 and the ratchet collar 22 for normally urging the ratchet collar 22 into engagement with a serrated collar 23, each of the wheels 18 having a collar 23 secured thereto. The serrations of the collar 22 and the collar 23 are disposed so that upon forward movement of the sprayer, which is effected by pushing the handle 14, a rotary motion is imparted to the axle 11 through the collars 22 and 23, and upon backward movement the collar 23 is capable of rotating without turning the collar 22. The axle 11 has mounted thereon, for rotation therewith, a gear 19 in engagement with a gear 19a carried on a shaft 19b, also journaled in the frame 10 at its inner end, and the shaft 19b is provided with a beveled gear 20 in engagement with a beveled gear 20a carried on a shaft 20b of a rotary pump 21.

The casing of the pump 21, at the inlet side, has a pipe 13 in communication therewith and with the tank 12, a strainer 28 being provided in the tank for preventing foreign matter from entering the pump connection 13. Below the strainer 28 a clean drain 27 is provided for draining the material from the tank, if desired.

The discharge side of the pump 21 is connected by a pipe 13a through a check valve 26 to a transversely disposed pipe 29 having a central branch 30 and side branches 31 and 32. Each of the branch pipes 30, 31 and 32 is provided at the front end thereof with a spray nozzle 17, valves 24 being provided in the pipe 29 for controlling the delivery to the respective nozzles 17 and permitting the use of one or more of the nozzles 17, as desired.

It will be noted that the main body of liquid is carried in the tank 12 and by the frame 10 and supported by the wheels 18. Upon advancing movement of the spraying machine by pushing the handle 14, the wheels 18, through either or both ratchet collars 22 or 23, effect a driving of the axle 11 and this driving movement is effective through the gears 19 and 19a, the shaft 19b, and the beveled gears 20 and 20a, for driving the pump 21 and effecting the delivery of liquid by the pump through the pipes 13a, 29, 30, 31 and 32 to the nozzles 17 in accordance with the positioning of the valves 24. So long as the vehicle is advanced, liquid from the tank 12 will be delivered and sprayed through the selected nozzles 17.

Upon discontinuance of forward movement of the spraying machine, spraying will be discontinued since the pump 21 is no longer actuated. The check valve 26 prevents the return of liquid to the pump 20 and also prevents dripping from the nozzles 17 when the machine is standing idle. The machine, if not being used, is preferably supported by the support 16.

It will be noted that the supply of spray may be distributed on one or both sides of the machine and onto the turf or other desired surface, and the delivery is controlled by the advancing movement of the spraying machine. The advance movement is utilized for providing the power for spraying and distribution of the spray. The weight of the liquid in the tank tends to hold the sprayer with the wheels 18 in frictional engagement with the ground, turf, or other surface along which the spraying machine is to be moved.

What I claim is:

1. In a vehicular spraying machine, a supporting frame, a handle connected to said frame and extending rearwardly therefrom for manual movement thereof, a tank carried by and extending upwardly from said frame, a transversely extending shaft in said frame below said tank, wheels at the outer ends of said shaft for tiltably supporting said frame and tank, a rotary pump carried by said frame below said tank and connected to said tank, a releasable driving connection between said wheels and said pump for driving said pump upon movement of said frame in an advancing direction, and forwardly disposed spray nozzles support by said frame connected to said pump for delivery of liquid in spray form delivered from said pump.

2. In a vehicular spraying machine, a supporting frame, a tank carried by and extending upwardly from said frame, wheels at opposite sides of said frame for tiltably supporting said frame and tank, a shaft mounted in said frame below said tank on which each of said wheels is journaled, a handle connected to said frame and extending rearwardly therefrom for manual movement of said frame and tank, a rotary pump carried by said frame below said tank and connected to said tank, driving connections including a ratchet between at least one of said wheels and said pump, and a plurality of forwardly disposed nozzles carried by said frame and connected to said pump and disposed below said tank for discharge of liquid delivered by said pump.

WALTER S. LAPP.

REFERENCES CITED

The following references are of record in the file of this patent:

UNITED STATES PATENTS

| Number | Name | Date |
|---|---|---|
| 7,273 | Price | Apr. 9, 1850 |
| 145,572 | Johnson | Dec. 16, 1873 |
| 258,233 | Kauffer | May 23, 1882 |
| 770,506 | Perkins | Sept. 20, 1904 |
| 1,602,314 | Signor | Oct. 5, 1926 |
| 1,742,350 | Hatch | Jan. 7, 1930 |
| 1,831,146 | Sirois | Nov. 10, 1931 |
| 2,149,112 | Brandt et al. | Feb. 28, 1939 |
| 2,201,995 | Erickson | May 28, 1940 |
| 2,388,114 | Boyce | Oct. 30, 1945 |